United States Patent [19]

Givens et al.

[11] Patent Number: 4,581,532

[45] Date of Patent: Apr. 8, 1986

[54] DIRECTIONAL EPITHERMAL NEUTRON DETECTOR

[75] Inventors: Wyatt W. Givens, Dallas; William R. Mills, Jr., Duncanville, both of Tex.

[73] Assignee: Mobil Oil Corporation, New York, N.Y.

[21] Appl. No.: 628,554

[22] Filed: Jul. 6, 1984

[51] Int. Cl.⁴ ............................................. G01V 5/00
[52] U.S. Cl. ...................................... 250/266; 250/390
[58] Field of Search ............ 250/256, 265, 266, 390 R

[56] References Cited

U.S. PATENT DOCUMENTS

| | | | |
|---|---|---|---|
| 2,680,201 | 6/1954 | Scherbatskoy | 250/267 |
| 3,183,358 | 5/1965 | Cooley | 250/266 |
| 3,264,477 | 8/1966 | Hall, Jr. | 250/390 |
| 3,382,363 | 5/1968 | Gant, Jr. et al. | 250/390 |
| 3,774,033 | 11/1973 | Scott et al. | 250/366 |
| 3,906,224 | 9/1975 | Scott et al. | 250/264 |
| 4,005,290 | 1/1977 | Allen | 250/266 |
| 4,097,737 | 6/1978 | Mills, Jr. | 250/269 |
| 4,241,253 | 12/1980 | Allen et al. | 250/390 |
| 4,506,156 | 3/1985 | Mougne | 250/266 |

Primary Examiner—Janice A. Howell
Attorney, Agent, or Firm—A. J. McKillop; Michael G. Gilman; George W. Hager, Jr.

[57] ABSTRACT

A directional epithermal neutron detector for use in well logging employs a plurality of neutron counters and a neutron moderating material. A first thermal neutron shield provides a cylindrical housing for the counters and moderating material. The counters are clustered to one side of the housing and the moderating material fills the remaining portion of the housing. A second thermal neutron shield separates the counters from the moderating material.

9 Claims, 3 Drawing Figures

DIRECTIONAL EPITHERMAL NEUTRON DETECTOR

BACKGROUND OF THE INVENTION

This invention relates to radioactive well logging processes and systems for irradiating subterranean formations under investigation with bursts of fast neutrons and, more particularly, to an improved epithermal neutron detector for use in characterizing the formation on the basis of the decay of the subsequently produced epithermal neutron population.

Various techniques may be employed in order to characterize subterranean formations with regard to their fluid or mineral content, lithologic characteristics, porosity, or to provide for stratigraphic correlation. The neutron source may be a steady-state source or a pulsed source. For example, neutron porosity logging may be carried out using a steady-state neutron source in order to bombard the formation with fast neutrons. The porosity of the formation then may be determined by measuring thermal neutrons employing two detectors at different spacings from the source or by measuring epithermal neutrons with a single detector.

In pulsed neutron logging procedures, the formations are irradiated with repetitive bursts of fast neutrons, normally neutrons exhibiting an energy greater than 1 Mev. When the fast neutrons enter the formation, they are moderated, or slowed down, by nuclei within the formation to form lower energy neutron populations. The fast neutrons are moderated to lower energy levels by the nuclear collision processes of elastic and inelastic scattering. In elastic scattering the neutron loses a portion of its energy in a collision that is perfectly elastic, i.e., the energy lost by the neutron is acquired as kinetic energy by the nucleus with which it collides. In inelastic scattering only some of the energy lost by the neutrons is acquired as kinetic energy by the nucleus with which it collides. The remaining energy loss generally takes the form of a gamma ray emitted from the collision nucleus.

In the course of moderation, the neutrons reach the epithermal range and thence are further moderated until they reach the thermal neutron range. Thermal neutrons are neutrons which are in thermal equilibrium with their environment. The distribution in speed of thermal neutrons follows the so-called Maxwellian distribution law. The energy corresponding to the most probable speed for a temperature of 20° C. is 0.025 electron volt. Epithermal neutrons are those neutrons which exhibit energies within the range from immediately above the thermal neutron region to about 100 electron volts. While the boundary between thermal and epithermal neutrons is, of necessity, somewhat arbitrary, it is normally placed in the range of 0.1–1.0 electron volt.

The populations of neutrons at the various energy levels decay with time following primary irradiation and thus offer means of characterizing the formation. For example, in the case of elastic scattering, which predominates for energies between a few electron volts and about 1 Mev, the number of collisions required for a neutron to moderate from one energy level to a second lower energy level varies more or less directly with the atomic weight of the nuclei available for collision. In subterranean formations, hydrogen nuclei present in hydrogenous materials such as oil, water, and gas tend to predominate in the slowing down process. Thus, the rate of decay of the epithermal neutron population gives a qualitative indication of the amount of hydrogenous material present which in turn may be indicative of the porosity of the formation.

For example, U.S. Pat. No. 4,097,737 to Mills discloses a method and system for epithermal neutron die-away logging utilizing a 14-Mev pulsed neutron source and a neutron detector that is sensitive to epithermal neutrons and highly discriminatory against thermal neutrons. The detector is relatively insensitive to the high energy neutrons and has a filter that renders it sharply insensitive to thermal neutrons.

SUMMARY OF THE INVENTION

In accordance with the present invention there is provided a borehole logging tool for directional epithermal neutron die-away logging of subterranean formations surrounding a borehole.

More particularly, a source of neutrons irradiates the formations surrounding a borehole with repetitive bursts of fast neutrons and at least one neutron counter detects epithermal neutrons returning to the borehole from the irradiated formations. An outer thermal neutron shield provides a housing for the neutron counter as well as for a neutron moderating material. An inner thermal neutron shield divides the housing so as to provide a first compartment bounded by the inner thermal neutron shield and a first portion of the outer thermal neutron shield and a second compartment bounded by the inner thermal neutron shield and a second portion of the outer thermal neutron shield. The neutron counter is positioned in the first compartment and the neutron moderating material is positioned in the second compartment. The borehole tool is positioned against one side of the borehole wall and azimuthly oriented so that the first compartment housing the neutron counter is next to the borehole wall. Formation epithermal neutrons penetrate into the first chamber through the first portion of the outer thermal neutron shield and are detected by the neutron counter for die-away measurement while borehole fluid epithermal neutrons penetrate into the second chamber through the second portion of the outer thermal neutron shield and are slowed down and lowered in energy by the moderating material and absorbed by the inner thermal neutron shield. In this manner, the directional sensitivity of the neutron counter to formation epithermal neutrons is maximized, while the directional sensitivity of the neutron counter to borehole fluid epithermal neutrons is minimized.

DESCRIPTION OF THE PREFERRED EMBODIMENT

The present invention is directed to a new and improved epithermal neutron detector for use in radioactivity well logging.

Figure 1:
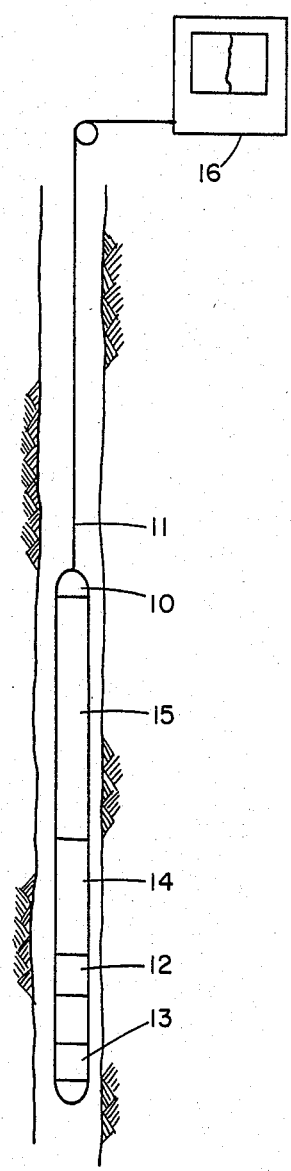
FIG. 1 illustrates a borehole logging tool incorporating the directional epithermal neutron detector of the present invention.

In FIG. 1, a well logging system is illustrated with which the directional epithermal neutron detector of the present invention may be employed. A borehole tool 10, supported by cable 11, comprises a high energy pulsed neutron source 12 and an epithermal neutron detector 13. A high voltage power supply 14 is provided for the source 12 and a module 15 is provided with circuits for utilization and modification of signals from detector 13. Also included are circuits for the control of the high voltage power supply 14. Cable 11 extends to a surface unit 16 where the signals from the epithermal neutron detector 13 are recorded along with an indication of borehole depth. The use of such a well logging system for epithermal neutron die-away logging is disclosed in the aforementioned patent to Mills.

A particularly suitable epithermal neutron detector, as disclosed in the Mills patent, is a proportional counter filled with helium-3 gas and surrounded by an outer thermal neutron filter, preferably a thin layer of cadmium or gadolinium. This filter prevents thermal neutrons which are in thermal equilibrium with their environment from entering the neutron detector. The energy corresponding to the most probable speed for thermal neutrons in equilibrium at a temperature of 20° C. is 0.025 electron volt. Epithermal neutrons are those neutrons which exhibit energies within the range from immediately above the thermal equilibrium region to about an energy of 100 electron volts. While the boundary between thermal and epithermal neutrons is, of necessity, somewhat arbitrary, it is normally placed in the range of 0.1 to 1.0 electron volt. Thus, the thermal neutron filter allows only epithermal neutrons above about 0.1 to 1.0 electron volt to enter the space between the neutron counter and the filter. The neutron counter measures the rate of decay of the epithermal neutron population passing through the filter as a qualitative indication of the amount of hydrogenous material present in the formation surrounding a borehole, which in turn may be indicative of the porosity of the formation.

In borehole logging operations involving the production of neutrons, it is usually possible to increase the efficiency of this epithermal neutron measurement by inserting an appropriate amount of neutron moderating material between the neutron counter and its thermal neutron filter, as shown in U.S. Pat. No. 4,241,253 to Allen, et al. A neutron moderating material, such as polyethylene, slows down epithermal neutrons which penetrate the thermal neutron shield to enable these neutrons to be more readily absorbed by the neutron counter. This occurs due to the moderator's effect in spreading the neutron counting rate in time. Energy loss due to scattering in the moderator lowers the speed of the neutrons and this delays their arrival at the counter. This delay in turn reduces the instantaneous maximum counting rate.

Such epithermal neutron detectors, as shown in the aforementioned patents to Mills and to Allen, et al., have omni azimuthal sensitivity. In a well logging operation, the borehole logging tool is not normally centered within the borehole, but rather rests along one side of the borehole wall. The borehole is usually filled with a drilling fluid of high hydrogen content. Neutrons within this borehole fluid influence the neutron detector of the logging tool as do those neutrons in the formation on the side of the borehole in contact with the logging tool. These neutrons within the borehole fluid include neutrons that have never been in the formation surrounding the borehole as well as those neutrons returning to the borehole following irradiation of the formation from the neutron source of the borehole logging tool. This gives rise to a neutron detector response that is made up of both a formation epithermal die-away component and a borehole fluid epithermal die-away component.

It has been found that the borehole fluid epithermal die-away component is quite dominant to the point that sensitivity to the formation epithermal die-away component is minimal. It is, therefore, a specific feature of the present invention to provide for a well logging operation in which the formation epithermal die-away sensitivity is maximized while the borehole fluid epithermal die-away sensitivity is minimal. In accordance with such aspect, the present invention provides for a directional epithermal neutron detector such as illustrated in FIG. 2.

Figure 2:
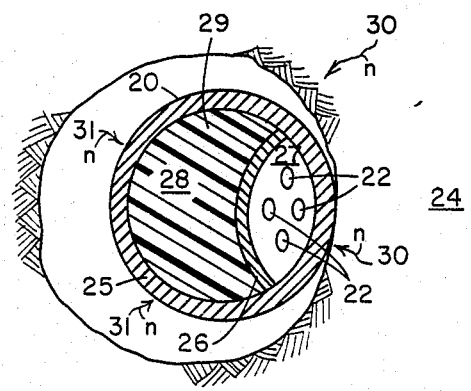
FIGS. 2 and 3 are cross-sectional views taken horizontally through the directional epithermal neutron detector of the present invention as it rests against the subterranean formation along one side of a borehole.

Referring now to FIG. 2, there is shown a cross-sectional view of the directional epithermal neutron detector of the present invention. The detector 20, as part of the borehole logging tool, is held against the formation 24 on one side of the borehole by conventional means (not shown), such as by the use of bow springs. A plurality of helium-3 thermal neutron counters 22 are clustered to one side of the neutron detector 20 and are enclosed by an outer thermal neutron shield 25 and by an additional inner thermal neutron shield 26, thereby forming a first compartment 27 which houses the counters 22 and a second compartment 28 which is filled with a thermal neutron moderating material 29. Suitable thermal neutron shielding material is cadmium or gadolinium, while suitable thermal neutron moderating material is polyethylene.

To utilize the neutron detector of FIG. 2 in a borehole logging operation to maximize directional sensitivity of the counters 22 to the formation epithermal neutron component and to minimize directional sensitivity to borehole fluid epithermal neutron component, the borehole logging tool is held against the formation 24 on one side of the borehole by means of bow springs (not shown) and is oriented such that the chamber 27 housing the neutron counter 22 is in juxtaposition with the borehole wall as pictured in FIG. 2. In this manner, neutron detector 20 becomes directional for epithermal neutron die-away logging of the formation adjacent the borehole.

More particularly, epithermal neutrons shown at 30 returning to the borehole from that portion of the formation in the vicinity of contact with the neutron detector 20 pass through the outer thermal neutron filter 25 into chamber 27 housing the counters 22 without thermal moderation. However, epithermal neutrons shown at 31 entering the neutron detector 20 by way of the borehole fluid must first primarily pass through the outer thermal neutron filter 25 into chamber 28 and then through the inner neutron filter 26 into chamber 27. Within chamber 28 these borehole fluid epithermal neutrons are scattered and lowered in speed by the moderating material 29, thus decreasing the likelihood that these neutrons will reach the chamber 27. In addition, the inner thermal neutron shield 26 serves to further reduce the number of borehole fluid moderated neutrons from reaching the neutron counters 22. In this way, the neutron detector 20 becomes directionally sensitive through a maximizing of the formation epithermal neutron die-away component and a minimizing of the borehole fluid epithermal neutron die-away component. Ideally, the surface area contact of that portion of the outer thermal neutron filter forming chamber 27 with the borehole wall should be maximized so as to minimize the amount of borehole fluid between chamber 27 and the formation. For a circular configuration of the outer thermal neutron shield, that portion of the outer thermal neutron shield forming chamber 27 should subtend an angle of no greater than about 90°.

Figure 3:
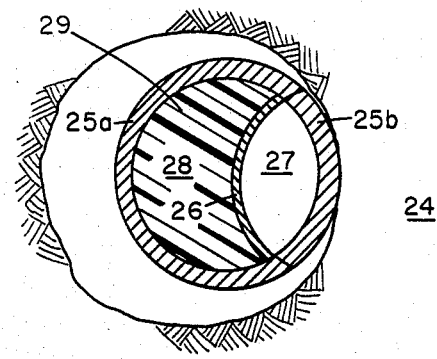

In a further aspect of the invention illustrated in FIG. 3, that portion of the outer epithermal neutron shield 25 which forms the chamber 27 along with the inner epithermal neutron shield 26, designated as 25b, is comprised of a different shielding material from the remaining portion of such outer shield, designated as 25a. For example, shield 25b may preferably comprise a thin layer of gadolinium of no greater than about 10 mils thickness, while the shields 25a and 26 may preferably comprise a much thicker layer of cadmium of at least about 100 mils thickness. The gadolinium filter 25b defines the area of the neutron detector 20 through which formation epithermal die-away neutrons more readily pass to the neutron counters 22. The cadmium filter 25a, along with the moderating material 29, defines the absorbing area of the neutron detector 20 which minimizes the passage of borehole fluid epithermal die-away neutrons to the neutron counters 22. Cadmium absorbs neutrons of all energy levels to some degree. Above about 0.4 electron volt the absorption cross-section of cadmium is proportional to $1/v$, wherein v is the velocity of neutrons, or to $1/\sqrt{E_n}$, where $E_n$ is the energy of neutrons, thus, the thicker the cadmium shielding, the greater the number of higher energy neutrons that are absorbed. The moderating material serves to moderate those higher energy neutrons that are not absorbed. Those moderated neutrons are then subject to absorption by the inner cadmium shield 26 to further reduce borehole fluid neutrons from reaching the neutron counters 22.

The foregoing described embodiments of the invention permit directional epithermal neutron die-away logging which was not possible with prior art epithermal neutron detectors. Other neutron filtering and moderating materials than those described above may be successfully utilized as well as an infinite variety of combinations of materials. It is to be understood that the present invention relates to a directional epithermal neutron die-away detector for maximizing sensitivity to formation epithermal die-away neutrons while minimizing sensitivity to borehole fluid epithermal die-away neutrons and that modifications or alterations may be made without departing from the spirit and scope of the invention as set forth in the appended claims.

What is claimed is:

1. A borehole tool for epithermal neutron die-away logging of subterranean formations surrounding a borehole, comprising:
   (a) a pulsed source of fast neutrons for irradiating the formations surrounding a borehole,
   (b) at least one neutron counter for counting epithermal neutrons returning to the borehole from said irradiated formations,
   (c) a neutron moderating material,
   (d) an outer thermal neutron shield providing a housing for said counter and said moderating material,
   (e) an inner thermal neutron shield dividing said housing so as to provide a first compartment bounded by said inner thermal neutron shield and a first portion of said outer thermal neutron shield and a second compartment bounded by said inner thermal neutron shield and a second portion of said outer thermal neutron shield, said counter being positioned within said first compartment and said moderating material being positioned within said second compartment, and
   (f) means for positioning said borehole tool against one side of said borehole wall and azimuthally orienting said borehole tool such that said first chamber is in juxtaposition with said borehole wall, whereby formation epithermal neutrons penetrating into said first chamber through said first portion of said outer thermal neutron shield are detected by said neutron counter for die-away measurement, thereby maximizing the directional sensitivity of said neutron counter to formation epithermal neutrons, while borehole fluid epithermal neutrons penetrating into said second chamber through said second portion of said outer thermal neutron shield are largely slowed down and lowered in energy by said moderating material and absorbed by said inner thermal neutron shield before penetrating into said first chamber, thereby minimizing the directional sensitivity of said neutron counter to borehole fluid epithermal neutrons.

2. The borehole tool of claim 1 wherein said first and second portions of said outer thermal neutron shield are comprised of different thermal neutron shielding materials.

3. The borehole tool of claim 2 wherein said first portion of said outer thermal neutron shield comprises a layer of gadolinium, and said second portion of said outer thermal neutron shield comprises a layer of cadmium.

4. The borehole tool of claim 3 wherein said cadmium layer is at least 100 mils thickness, and said gadolinium layer is no greater than about 10 mils thickness.

5. The borehole tool of claim 3 wherein said inner thermal neutron shield comprises cadmium.

6. The borehole tool of claim 1 wherein the outer surface of said first portion of said outer thermal neutron shield is configured so as to maximize surface area contact with the borehole wall.

7. The borehole tool of claim 1 wherein said first portion of said outer thermal neutron shield is configured so as to minimize the amount of borehole fluid between said first portion and said borehole wall.

8. The borehole tool of claim 7 wherein said outer thermal neutron shield is circular and said first portion of said outer thermal neutron shield subtends an angle of no greater than about 90°.

9. A directional epithermal neutron detector, comprising:
   (a) a plurality of thermal neutron counters,
   (b) a neutron moderating material,
   (c) a first thermal neutron shield providing a cylindrical housing for said counters and said moderating material, said counters being clustered to one side of said housing and said moderating material filling the remaining portion of said housing,
   (d) a second thermal neutron shield separating said plurality of counters from said moderating material, that portion of said first thermal neutron shield on the side of said housing at which said plurality of counters are clustered comprising gadolinium of no greater than 10 mils thickness and the remaining portion of said first thermal neutron shield as well as said second thermal neutron shield comprising cadmium of at least 100 mils thickness.

* * * * *